No. 749,737. PATENTED JAN. 19, 1904.
J. H. LEY.
PNEUMATIC STACKER.
APPLICATION FILED JULY 22, 1903.
NO MODEL.
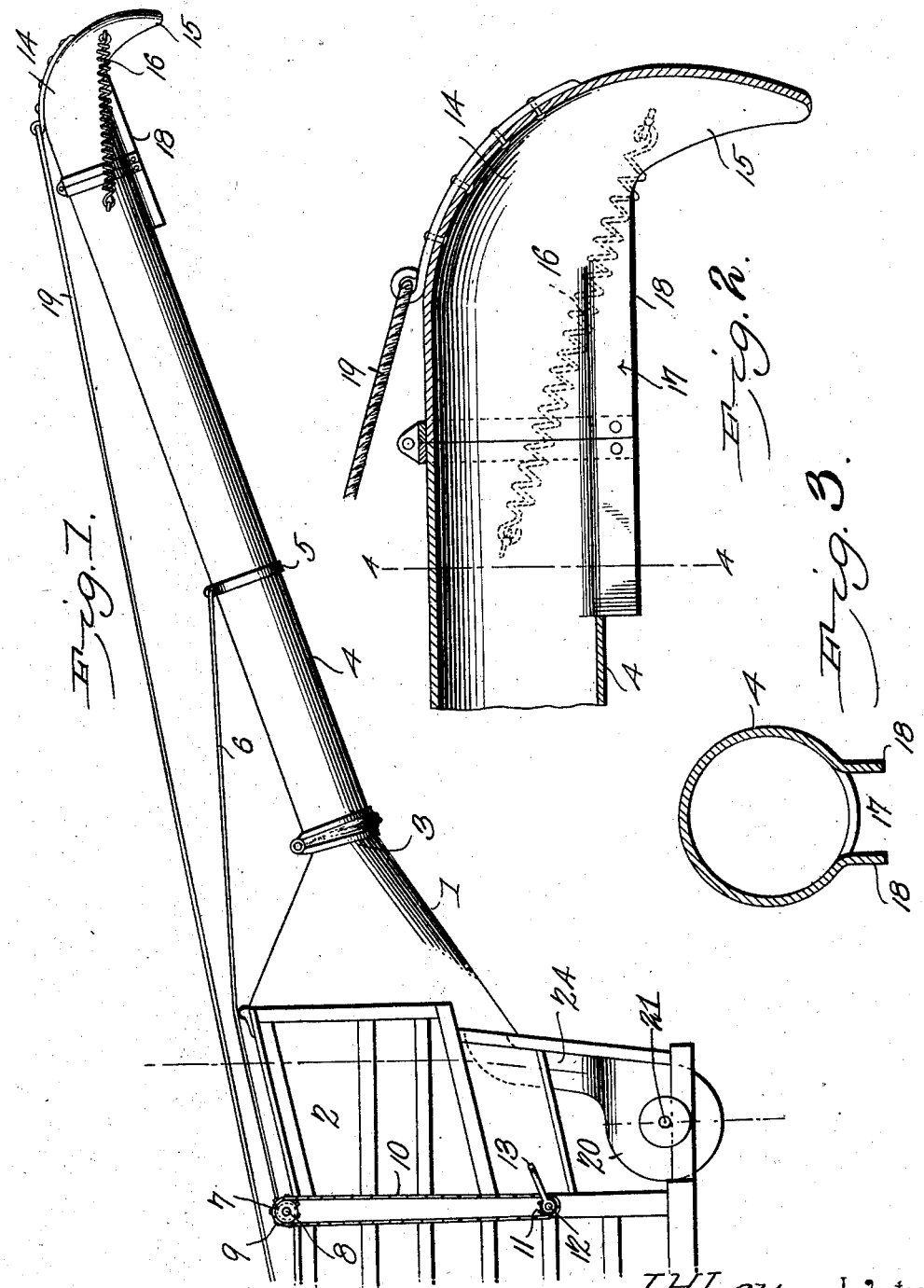

No. 749,737. Patented January 19, 1904.

UNITED STATES PATENT OFFICE.

JOSEPH H. LEY, OF KELLOGG, MINNESOTA.

PNEUMATIC STACKER.

SPECIFICATION forming part of Letters Patent No. 749,737, dated January 19, 1904.

Application filed July 22, 1903. Serial No. 166,600. (No model.)

*To all whom it may concern:*

Be it known that I, JOSEPH H. LEY, a citizen of the United States, residing at Kellogg, in the county of Wabasha and State of Minnesota, have invented a new and useful Pneumatic Stacker, of which the following is a specification.

This invention relates to pneumatic stacking devices of that kind which are used in connection with threshing machinery for the purpose of conveying the straw discharged by the straw-carrier to the desired place of deposit; and my invention has for its object to provide a device of this class which shall be simple in construction, durable, and effective in operation.

With these and other ends in view my invention consists in the improved construction, arrangement, and combination of parts, which will be hereinafter fully described, and particularly pointed out in the claim.

In the accompanying drawings I have shown a simple and preferred form of embodiment of my invention; but I desire to have it understood that I do not necessarily limit myself with regard to the structural details herein set forth, but reserve the right to any changes and modifications as to size, proportion, or relative arrangement of the parts employed which may be legitimately resorted to within the scope and spirit of my invention.

In said drawings, Figure 1 is a side elevation showing my improved pneumatic stacking apparatus attached to the tail end of a threshing-machine. Fig. 2 is a longitudinal sectional view of the upper end of the tubular conveyer and the hood connected with the same. Fig. 3 is a transverse sectional view taken on the line 4 4 in Fig. 3.

Corresponding parts in the several figures are indicated by similar numerals of reference.

In carrrying out my invention I provide a casing 1, the front end of which is of a suitable size and shape to be attached to the delivery end of a threshing-machine (indicated at 2) in such a manner that all the straw, chaff, and the like delivered from said threshing-machine shall pass into the casing 1, which is contracted rearwardly and which terminates in a circular opening 3, which in practice is intended to be about eighteen inches in diameter. Any suitable means for attaching the casing 1 to the threshing-machine may be employed within the scope of my invention.

Hingedly connected with the discharge-opening 3 of the casing 1 is a tubular conveyer 4, which is of practically the same diameter as the discharge-opening 3. The conveyer-tube is provided with a band 5, connected by a flexible connection 6 with a drum 7 upon a shaft 8, which is provided at one end with a sprocket-wheel 9, connected by a chain 10 with a pinion 11 upon a short shaft 12, journaled to the casing of the machine in such a position as to be easily within the reach of a person standing upon the ground. The shaft 12 has a crank 13, by means of which it may be operated to rotate the drum 7, thus winding upon the same the flexible connection 6 for the purpose of raising the conveyer-tube 5 to the desired elevation. The rope or flexible connection 6 will thus constitute a brace, whereby the conveyer-tube is held in position for operation.

Hingedly connected with the upper end of the conveyer-tube is a hood 14, provided at its outer end with a downwardly-extending flange 15. The under side of this tube is open for the escape of the straw and other material that passes from the threshing-machine, and said hood is normally held in what may be termed a "closed" position by means of springs 16, connecting the flange 15 with the upper edge of the conveyer-tube 4. The latter at its extreme upper end is provided in its under side with a T-shaped slot forming an opening 17, provided at the margin thereof with flanges 18, which correspond with the sides of the hood, the opening in which coöperates with the opening 17 in the body of the conveyer-tube to form a very large escape-opening for the straw and other material passing through the conveyer-tube. A flexible connection 19 is suitably connected with the hood 14, whereby the latter may be turned upon its hinge against the tension of the springs 16 for the purpose of throwing it back whenever it shall be desired to expel the material passing through the conveyer-tube to a greater distance from the machine than would be possible if the flange 15 were allowed to lie in the path of such material. The flexible connection 19 may be made fast temporarily and in any suitable position to the deck of the threshing-machine, as will be readily understood..

A frame suitably connected with the thresher-frame supports a fan-casing 20 of the fan-carrying shaft 21. In practice it is my intention to use two fans and to let the outlets or spouts 24 of the fan-casings converge, so as to discharge into the casing 1 directly below the discharge of the threshing-machine. The upper portion of one of the outlets 24 is shown in dotted lines in Fig. 1. The air-blast will thus be discharged into the lower part of the casing 1 directly in the path of the material escaping from the threshing-machine. Said material will thus obviously be forced through the conveyer-tube and expelled through the opening in the hood and at the upper end of said tube. When the hood is in its normal position, with the flange 15 depending in such a position as to intercept the blast, the material will necessarily be expelled in a downward direction. By adjusting the hood to such a position as to bring the flange 15 out of the path of the air-blast the material passing through the tube may be conveyed to a much greater distance. It is obvious that means may be provided for the lateral adjustment of the conveyer-tube, as well as for its vertical adjustment, such means being ordinary and well known, for which reason I have deemed it unnecessary to illustrate them particularly in this application.

Having thus described my invention, I claim—

In a pneumatic straw-stacker, a conveyer-tube having a hinged spring-actuated hood with a depending flange at its outer end, said conveyer-tube and hood being provided with alining longitudinally-flanged discharge-openings.

In testimony that I claim the foregoing as my own I have hereto affixed my signature in the presence of two witnesses.

JOSEPH H. LEY.

Witnesses:
JOHN COSTELLO,
S. M. ODELL.